(12) United States Patent
Islam et al.

(10) Patent No.: US 6,801,012 B1
(45) Date of Patent: Oct. 5, 2004

(54) SENSORLESS CONTROL OF SWITCHED RELUCTANCE ELECTRIC MACHINES

(75) Inventors: Mohammad S. Islam, Saginaw, MI (US); Sayeed A. Mir, Saginaw, MI (US); Tomy Sebastian, Saginaw, MI (US); Iqbal Husain, Copley, OH (US)

(73) Assignees: Delphi Technologies, Inc., Troy, MI (US); The University of Akron, Akron, OH (US)

( * ) Notice: Subject to any disclaimer, the term of this patent is extended or adjusted under 35 U.S.C. 154(b) by 0 days.

(21) Appl. No.: 10/404,421

(22) Filed: Mar. 31, 2003

(51) Int. Cl.$^7$ .............................................. H02P 1/46
(52) U.S. Cl. ...................... 318/701; 318/798; 318/806; 318/715; 318/721
(58) Field of Search ................................ 318/701, 798, 318/806, 138, 139, 439, 715, 721

(56) References Cited

U.S. PATENT DOCUMENTS

| | | | |
|---|---|---|---|
| 6,137,257 A | 10/2000 | Heber et al. | |
| 6,448,736 B1 | * 9/2002 | Lajsner et al. | ............... 318/701 |
| 6,456,031 B1 | * 9/2002 | Gallegos-Lopez et al. | .. 318/701 |
| 6,472,842 B1 | * 10/2002 | Ehsani | ........................ 318/701 |
| 6,593,720 B2 | 7/2003 | Omekanda | |

OTHER PUBLICATIONS

"Sensorless Speed Control of a Switched Reluctance Motor for Industrial Applications"; Authors: J. Wolff, R. Rahner and H. Späth; Optimization of Electrical and Electronic Equipments—Brasov 1998; vol. 2; pp. 457–462.

"A Sensor Less SR Motor Position Measurement Method"; Authors: Henrik Huovila and Olavi Karasti.

* cited by examiner

*Primary Examiner*—Karen Masih
(74) *Attorney, Agent, or Firm*—Michael D. Smith (57) ABSTRACT

A system and methodology for control of a switched reluctance electric machine comprising: a switched reluctance electric machine including a sensor generating and transmitting a sensor signal indicative of an operating characteristic; a controller operatively coupled to the switched reluctance motor and the sensor; and the controller executing a method. The method comprises: probing a selected diagnostic phase with a pulse injection process; measuring an actual operating characteristic of the switched reluctance electric machine; computing an inductance based on the actual operating characteristic and correlating the inductance with a position to formulate an estimated position; modeling the switched reluctance electric machine to formulate an observer-based estimated position; selecting at one of the estimated position, the observer-based estimated position, and a combination thereof to formulate a selected position of the switched reluctance machine; and controlling said switched reluctance machine based on said selected position and a command.

14 Claims, 4 Drawing Sheets

SENSORLESS CONTROL OF SWITCHED RELUCTANCE ELECTRIC MACHINES

BACKGROUND

This invention relates to sensorless operation of a switched reluctance electric machine.

A switched reluctance motor (SRM) is a viable candidate for various motor control applications due to its rugged and robust construction. A high-performance SRM drive is possible by appropriately scheduling the commutation angles using accurate rotor position and speed information. The position information for a SRM drive is usually, obtained from a position sensor, often a shaft-mounted encoder or resolver, which adds cost and complexity to the overall drive system.

Sensorless operation is a key feature required to make SRM drives industrially competitive. Sensorless operation is important for various applications due to the need for minimum package size, high reliability and low cost for electric motor driven actuators. Use of discrete position sensors adds cost and complexity to the overall drive system and generally reduces reliability especially in harsh environments. Reliable and accurate indirect position sensing for low-cost actuators using switched reluctance motors is a key step towards developing low-cost, high-performance actuators. Therefore, it is desired to have a reliable, robust and preferably low-cost indirect source of position information for high-performance SRM drives.

BRIEF SUMMARY

Disclosed herein is a method for sensorless control of a switched reluctance electric machine comprising: probing a selected diagnostic phase of a switched reluctance electric machine with a pulse injection process; measuring an actual operating characteristic of the switched reluctance electric machine; computing an inductance based on the actual operating characteristic and correlating the inductance with a position to formulate an estimated position; modeling the switched reluctance electric machine to formulate a modeled position; selecting at least one of the estimated position, the modeled position, or a combination thereof to formulate a selected position of the switched reluctance machine; controlling the switched reluctance machine based on the selected position and a desired command.

Also disclosed herein is a system for control of a switched reluctance electric machine comprising: a switched reluctance electric machine including a sensor generating and transmitting a sensor signal indicative of an operating characteristic; a controller operatively coupled to the switched reluctance motor and the sensor; and the controller executing the following method. The method comprises: probing a selected diagnostic phase of the switched reluctance electric machine with a pulse injection process; measuring an actual operating characteristic of the switched reluctance electric machine; computing an inductance based on the actual operating characteristic and correlating the inductance with a position to formulate an estimated position; modeling the switched reluctance electric machine to formulate a modeled position; selecting at least one of the estimated position, the modeled position, or a combination thereof to formulate a selected position of the switched reluctance machine; and controlling said switched reluctance machine based on said selected position and a desired command.

Further disclosed herein is a system for controlling a switched reluctance motor in a vehicle steering system comprising: a means for probing a selected diagnostic phase of the switched reluctance electric machine with a pulse injection process; a means for measuring an actual operating characteristic of the switched reluctance electric machine; a means for computing an inductance based on the actual operating characteristic and correlating the inductance with a position to formulate an estimated position; a means for modeling the switched reluctance electric machine to formulate a modeled position; a means for selecting at least one of the estimated position, the modeled position, or a combination thereof to formulate a selected position of the switched reluctance machine; and a means for controlling the switched reluctance machine based on the selected position and a desired command.

Also disclosed herein in another embodiment is a steering system with a switched reluctance electric motor comprising: a steerable wheel coupled to a switched reluctance motor; a controller operatively coupled to the switched reluctance motor; the controller generating command to direct said switched reluctance motor. The controller also executes a method for control comprising: probing a selected diagnostic phase of the switched reluctance electric machine with a pulse injection process; measuring an actual operating characteristic of the switched reluctance electric machine; computing an inductance based on the actual operating characteristic and correlating the inductance with a position to formulate an estimated position; modeling the switched reluctance electric machine to formulate a modeled position; selecting at least one of the estimated position, the modeled position, or a combination thereof to formulate a selected position of the switched reluctance machine; and controlling the switched reluctance machine based on the selected position and a desired command.

Also disclosed herein in yet another exemplary embodiment is a storage medium encoded with a machine-readable computer program code, the computer program code including instructions for causing a controller to implement the abovementioned method for control of a switched reluctance electric machine.

Further disclosed herein in yet another exemplary embodiment is a computer data signal, the data signal comprising code configured to cause a controller to implement the abovementioned method for control of a switched reluctance electric machine.

BRIEF DESCRIPTION OF THE DRAWINGS

The present invention will now be described, by way of an example, with references to the accompanying drawings, wherein like elements are numbered alike in the several figures in which.

DESCRIPTION OF AN EXEMPLARY EMBODIMENT

Figure 1:
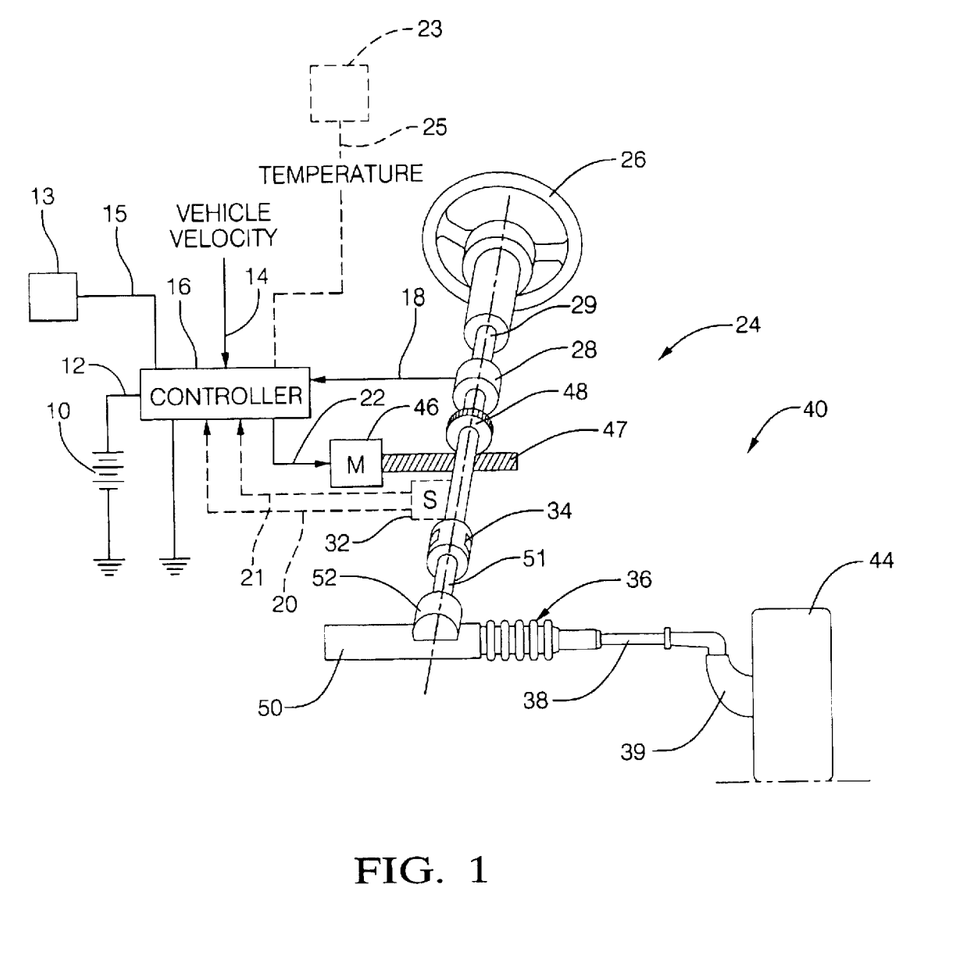
FIG. 1 depicts an electric power steering system employing an exemplary embodiment.

Referring to FIG. 1, reference numeral 40 generally designates a motor vehicle electric power steering system suitable for implementation of the disclosed embodiments. The steering mechanism 36 is a rack-and-pinion type system and includes a toothed rack (not shown) within housing 50 and a pinion gear (also not shown) located under gear housing 52. As the operator input, hereinafter denoted as a steering wheel 26 (e.g. a hand wheel and the like) is turned, the upper steering shaft 29 turns and the lower steering shaft 51, connected to the upper steering shaft 29 through universal joint 34, turns the pinion gear. Rotation of the pinion gear moves the rack, which moves tie rods 38 (only one shown) in turn moving the steering knuckles 39 (only one shown), which turn a steerable wheel(s) 44 (only one shown).

Electric power steering assist is provided through the control apparatus generally designated by reference numeral 24 and includes the controller 16 and an electric machine 46 in this instance a switched reluctance motor hereinafter denoted motor 46. The controller 16 is powered by the vehicle power supply 10 through line 12. The controller 16 receives a vehicle speed signal 14 representative of the vehicle velocity. Steering wheel position may be measured through optional position sensor 32, supplies to the controller 16 a steering wheel position signal 20. Optional position sensor 32 is connected to the steering shaft 51 to detect the angular position θ. The encoder may sense the rotary position based on optical detection, magnetic field variations, or other methodologies. Typical position sensors include potentiometers, resolvers, synchros, encoders, and the like, as well as combinations comprising at least one of the forgoing. The position encoder outputs a position signal 20 indicating the angular position of the steering shaft 51 and thereby, that of the motor 46.

Steering wheel velocity may be measured with a tachometer and transmitted to controller 16 as a steering wheel velocity signal 21. A steering wheel velocity denoted $\omega_s$ may be measured, calculated or a combination thereof. For example, the steering wheel velocity $\omega_s$ may be calculated as the change of the steering wheel position signal 20 (also denoted θ) as measured by a position sensor 32 over a prescribed time interval. For example, steering wheel velocity $\omega_s$ may be determined as the derivative of the motor position θ from the equation $\omega_s = \Delta\theta/\Delta t$ where Δt is the sampling time and Δθ is the change in position during the sampling interval. It will be appreciated that there are numerous well-known methodologies for performing the function of a derivative.

As the steering wheel 26 is turned, torque sensor 28 senses the torque applied to the steering wheel 26 by the vehicle operator. The torque sensor 28 may include a torsion bar (not shown) and a variable resistive-type sensor (also not shown), which outputs a variable torque signal 18 to controller 16 in relation to the amount of twist on the torsion bar. Although this is the preferable torque sensor, any other suitable torque-sensing device used with known signal processing techniques will suffice. In response to the various inputs, the controller sends a command 22 to the electric motor 46, which supplies torque assist to the steering system through worm 47 and worm gear 48, providing torque assist to the vehicle steering.

It should be noted that although the disclosed embodiments are described by way of reference to motor control for electric steering applications, it will be appreciated that such references are illustrative only and the disclosed embodiments may be applied to any motor control application employing a switched reluctance type motor, e.g., steering, valve control, and the like. It should also be noted that reference herein to electric machines including, but not limited to, motors, or more specifically switched reluctance motors, hereafter, for brevity and simplicity, reference will be made to motors only without limitation.

In the control system 24 as depicted, the controller 16 utilizes the torque, position, and speed, and like, to compute a command(s) to motor 46 to deliver the required output torque. Controller 16 is disposed in communication with the various systems and sensors of the motor control system. Controller 16 receives signals from each of the system sensors, quantifies the received information, and provides an output command signal(s) in response thereto, in this instance, for example, to the motor 46. Controller 16 is configured to develop the necessary voltage(s) out of inverter (not shown), which may optionally be incorporated with controller 16 and will be referred to herein as controller 16, such that, when applied to the motor 46, the desired torque or position is generated. Because these voltages are related to the position and speed of the motor 46 and the desired torque, the position and/or speed of the motor 46 and the torque applied by an operator are determined. Desired torque may be determined by one or more torque sensors 28 transmitting torque signals 18 indicative of an applied torque. An exemplary embodiment includes such a torque sensor 28 and the torque signal(s) 18 therefrom, as may be responsive to a compliant torsion bar, T-bar, spring, or similar apparatus (not shown) configured to provide a response indicative of the torque applied.

Optionally, a temperature sensor(s) 23 located at the electric machine 46. Preferably, the temperature sensor 23 is configured to directly measure the temperature of the sensing portion of the motor 46. The temperature sensor 23 transmits a temperature signal 25 to the controller 16 to facilitate the processing prescribed herein and compensation. Typical temperature sensors include thermocouples, thermistors, thermostats, and the like, as well as combinations comprising at least one of the foregoing sensors, which when appropriately placed provide a calibratable signal proportional to the particular temperature.

The control system 24 may further include a current sensor(s) and voltage sensor(s) for measuring the current supplied to the SRM 46 and voltage applied to the SRM. The current sensor and voltage sensor may be internal to the controller 16 or external. In an exemplary embodiment the current sensor and voltage sensor are integral with the controller 16. Also received by the controller 16 are a variety of implementation specific parameters, signals and values for initialization and characterization of the prescribed processes and to identify various states of the processes herein.

The steering wheel position signal 20, steering wheel velocity signal 21, a torque signal(s) 18, measured current and voltage among others, are applied to the controller 16. The controller 16 processes all input signals to generate values corresponding to each of the signals resulting in a rotor position value, a motor speed value, a torque value, a current value and a voltage value being available for the processing in the algorithms as prescribed herein. Measurement signals, such as the abovementioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

In order to perform the prescribed functions and desired processing, as well as the computations therefore (e.g., the position determination, control algorithm(s), and the like), controller 16 may include, but not be limited to, a processor (s), computer(s), DSP(s), memory, storage, register(s), timing, interrupt(s), communication interface(s), and input/output signal interfaces, and the like, as well as combinations comprising at least one of the foregoing. For example, controller 16 may include input signal processing and filtering to enable accurate sampling and conversion or acquisitions of such signals from communications interfaces. Additional features of controller 16 and certain processes therein are thoroughly discussed at a later point herein.

As exemplified herein and disclosed above one such process may be determining a position and velocity for motor 46. Controller 16 receives various input signals including, but not limited to, those identified above, to facilitate such processing and may provide one or more output signals in response. Once again, it will be appreciated that while the embodiment disclosed herein is explained by way of discussion concerning torque signals and torque sensors, other sensors and sensed parameters may be equally applicable.

As stated earlier, a switched reluctance motor (SRM) is a often desirable for various motor control applications due to its rugged and robust construction. Moreover, SRM drives include an inherent robustness in that one phase and the torque generated therefrom is not directly related to the other phases. Advantageously, this means that inoperability of a particular phase may not mandate immediate service and permit continued operation. A high-performance SRM drive is possible by appropriately scheduling the commutation angles using accurate rotor position and speed information. The position information for a SRM drive is usually, obtained from a position sensor, often a shaft-mounted encoder or resolver, which adds cost and complexity to the overall drive system.

Sensorless operation is a key feature required to make SRM drives industrially competitive. Sensorless operation is desired for various applications due to the need for minimum package size, high reliability and low cost for electric motor driven actuators.

Sensorless operation of a switched reluctance motor has been discussed in the art in various forms broadly categorized as intrusive and non-intrusive methods. The intrusive method involves active probing of the idle phases of an SRM. The inductances of the SRM phases are measured by probing signals. Unfortunately, the assumptions and methodology employed in this method automatically limits its applicability at high speeds.

The non-intrusive method employs terminal measurements of the phase current and phase voltage of the SRM 46. Error minimization between the model and the actual machine facilitate the convergence of rotor position and speed to the actual values enhancing the accuracy of the model. The method significantly depends on the precision of the model. Hence, self-tuning or online adaptation may improve the quality of the estimation provided by these methods. Unfortunately, the methodology and assumptions used in this method limits the performance at zero or near zero speeds.

While each of the methodologies discussed above may be appropriate for a selected purpose, or limited operation, none are adequate to address a broad scheme of operational scenarios, including, but not limited to, start, acceleration, low speed, high speed, and the like, as well as combinations including at least one of the foregoing.

Figure 2:
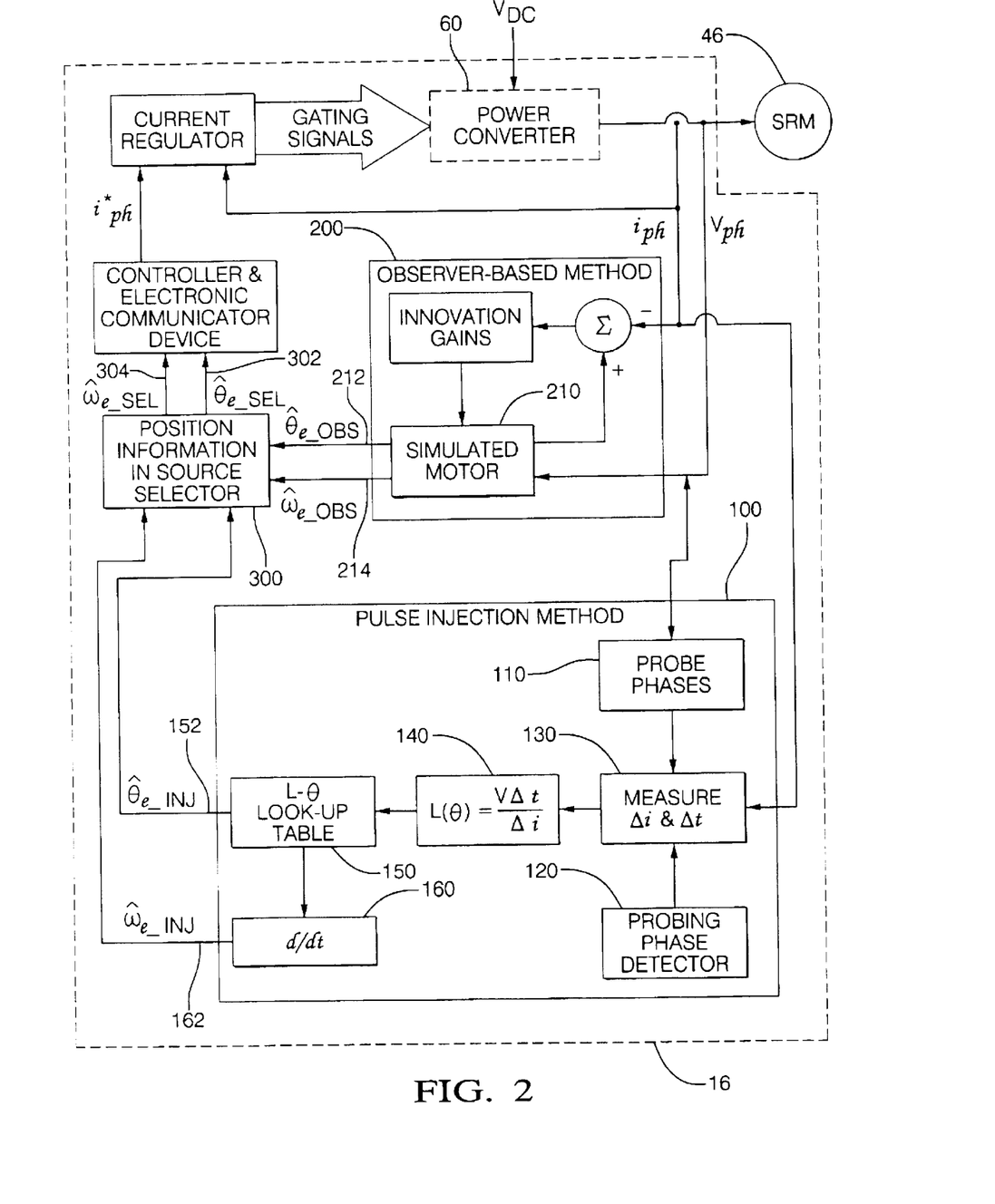
FIG. 2 is a simplified diagram depicting algorithm as may be employed in an exemplary embodiment for a hybrid indirect estimator for determination of position or velocity.

Therefore, disclosed herein in an exemplary embodiment is a method for controlling a SRM that bridges the intrusive and non-intrusive indirect position sensing methods for the SRM. Referring now to FIG. 2 as well, the methodology automatically inherits and eliminates the merits and demerits associated with the intrusive and non-intrusive methods, respectively. In an exemplary embodiment, the initial rotor position at startup is determined using an observer (non-intrusive methodology) driven by probing pulses (intrusive methodology) preferably employing the existing power converter 60 (in FIG. 2). Once the rotor position is known at startup, the starting and initial open loop operation of the SRM 46 is accomplished by a pulse injection process 100 (intrusive method) using the same power converter 60, while the continuous and closed loop operation is established by an observer-based process 200 (non-intrusive method). Advantageously, the methodology of an exemplary embodiment automatically eliminates the deficiencies associated with existing sensorless SRM operation as discussed above. Since, the disclosed embodiments incorporate and integrate two different methods of sensorless operation, which are tracked independently. Moreover, the reliability of the computed position information is further enhanced by the inherent redundancy of the processes (depicted at 100 and 200), which facilitates certain applications where robustness and reliability are more important. Transition between the processes (100 and 200) is achieved according to the operating speed and the convergence of the observer-based estimation.

Continuing with FIG. 2, the methodology utilizes terminal measurements of SRM voltages and currents. Advantageously, all remaining processing may be accomplished by software internal to controller 16. In the pulse injection process 100, a current rise $\Delta i$ is measured when a known positive voltage is applied across a selected diagnostic phase for a known time as depicted at blocks 110, 120, and 130 respectively. An unsaturated position responsive inductance is calculated as shown at block 140, which may then be applied to a L-θ look-up table is used to extract the position information as depicted at process block 150. The above procedure may be used to determine the initial position as well as get the motor running. A differentiation process at block 160 may be used to compute the speed information if needed. It will be appreciated that numerous numerical methods for computing a derivative may be employed as discussed herein above. The L-θ look-up table and differentiation yield a pulse injection based estimated position 152, also denoted $\hat{\theta}_{e\_INJ}$, and a pulse injection based estimated velocity 162, also denoted $\omega_{e\_INJ}$.

Turning now to the observer-based process 200, this methodology uses phase voltage and phase current information as an input to a model 210 for the SRM 46. A recursive process as depicted at block 220 operates to minimize any error between the model 210 and the actual characteristics of the physical SRM 46 as indicated by the phase voltage and phase current. It will be appreciated that when the response of the model 210 and SRM 46 match then the observer-based estimated position 212, also denoted $\hat{\theta}_{e\_OBS}$, and observer-based estimated velocity 214, also denoted $\omega_{e\_OBS}$ output from the observer 200 converge to the actual values for the SRM 46.

In an exemplary embodiment, the pulse injection based estimated position 152, pulse injection based estimated velocity 162, observer-based position 212 and observer-based velocity 214 are applied to a selection process identified by block 300. The selection process is employed to provide the source of the estimated position and speed information depending on the operating condition. It will be appreciated that it may be desired to utilize estimated or modeled parameters or a combination thereof under differing operational scenarios. For example, it may be desired to utilize the pulse injection based estimated position 152, $\hat{\theta}_{e\_INJ}$, and pulse injection based estimated velocity 162, $\hat{\omega}_{e\_INJ}$, at start up and low speed operation for the SRM 46, while it may be desired to utilize the observer-based estimated position 212, $\hat{\theta}_{e\_OBS}$, and observer-based estimated velocity 214, $\hat{\omega}_{e\_OBS}$, under higher speed conditions. Therefore, the resultant of the selection process at block 300 is a selected position 302, also denoted $\hat{\theta}_{e\_SEL}$ and a selected velocity 304, also denoted $\hat{\omega}_{e\_SEL}$.

Turning now to the sensorless operation of a SRM 46, a first operational condition to consider is starting. It will be appreciated that a given operational methodology would preferably be configured to start the SRM 46 from any initial condition or position. Therefore, in an exemplary embodiment, the advantages of the combination of the pulse injection process 100 and observer based process 200 becomes readily apparent. For example, in this instance, the observer-based process 200 is initiated by driving the SRM 46 with a burst of probing pulses from the pulse injection process 100 to facilitate determination of the initial rotor position. Advantageously, this approach eliminates the common practical difficulties encountered by the model 210 at standstill or at very low speeds. It will further be appreciated that many models or simulations of dynamic systems include differentiations or integrations, which are sensitive to initial conditions and are comparatively slow to respond to large transients. As such, inadequate consideration of initial conditions can introduce large errors into a model or simulation of a dynamic system. In an exemplary embodiment as disclosed herein this issue is addressed by the combination of the processes. Namely employing the pulse injection process 100 to facilitate establishing initial conditions for the modeling in the observer-based process 200. In this instance, high frequency probing pulses facilitate initialization of the model 210 quickly to establish the estimated position 212 and estimated velocity 214.

Figure 3:
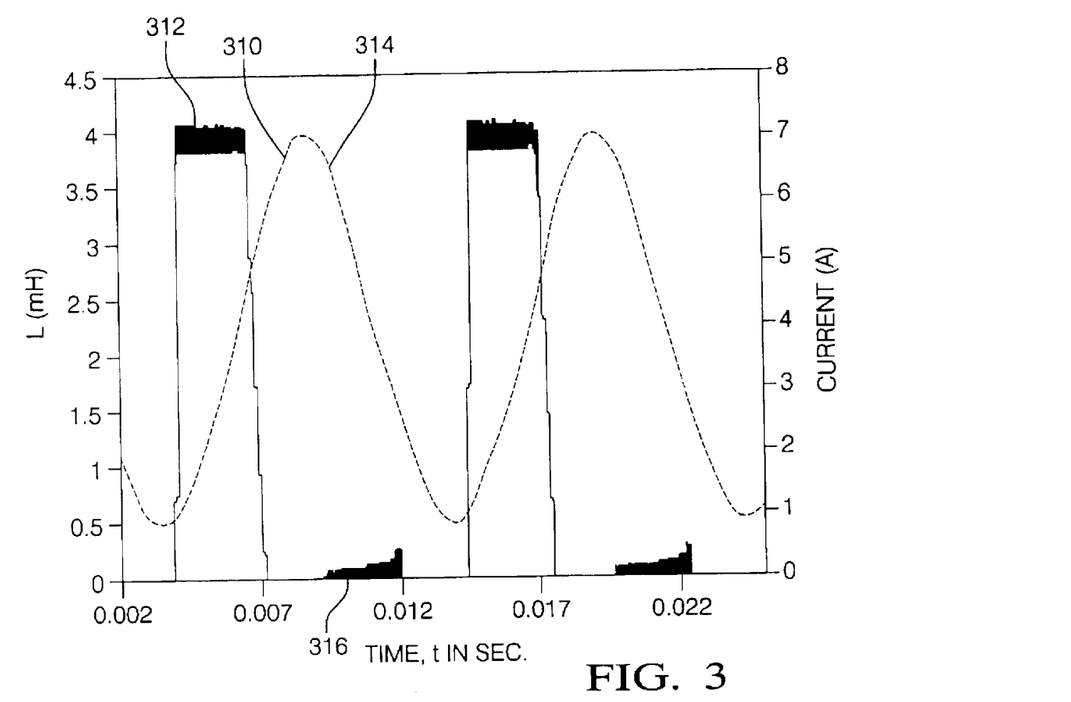
FIG. 3 shows the phase current with its inductance profile when the motor has just started running in the position sensorless mode of an exemplary embodiment.

Turning now to address the operation of the SRM 46 in a running condition, the methodology of an exemplary embodiment utilizes the pulse injection process 100 to operate upon two phases of the SRM 46 simultaneously. The first, the torque-producing phase (e.g., the phase of the SRM 46 actively controlled for producing torque) is also denoted the conducting phase and the second is denoted the diagnostic phase, which is probed to provide the position information. For continuous operation and torque production, phase commutation is initiated and achieved by comparing the probing current in the selected diagnostic phase with a predefined threshold value. FIG. 3 shows the phase current with its inductance profile when the motor has just started running in the position sensorless mode. The plot shows the existence of both the main current and the probing current for a particular phase over time. In an exemplary embodiment, the SRM phase commutation is initiated by comparing the magnitude of the probing current with a selected threshold value. The magnitude of the threshold value determines the turn-on angle. In other words, when the probing current in the selected diagnostic phase achieves the selected threshold a phase commutation for another phase, which is conducting or torque producing is executed. In an exemplary embodiment the selected threshold of initiating the phase commutation is determined based on determined inductance. For example, in an embodiment, when the inductance exhibits a positive slope as indicated by 310 in the figure, that particular phase is selected to conduct current and produce torque as depicted by the current plot at 312. When the inductance for that phase exhibits a negative slope as identified by 314, that phase is utilized as a diagnostic phase, and the probing current is injected as shown at 316. The selected thresholds may be based upon desired control requirements, torque desired, torque ripple minimizaton, and the like, as well as combinations including at least one of the foregoing.

Figure 4:
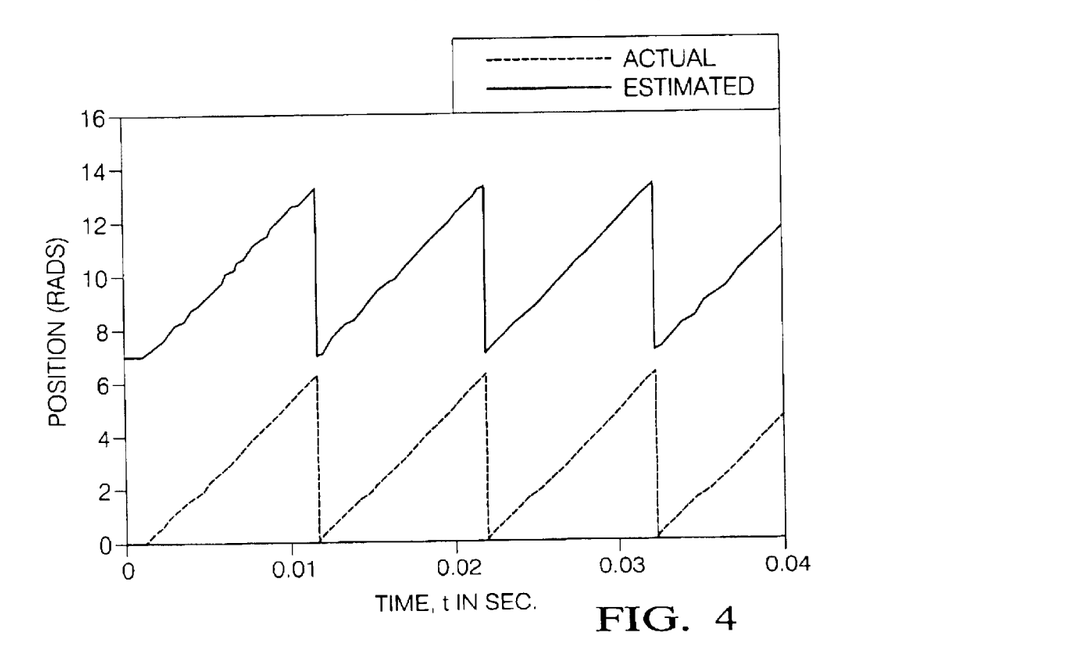
FIG. 4 depicts observer based position estimation for an exemplary embodiment.
Figure 5:
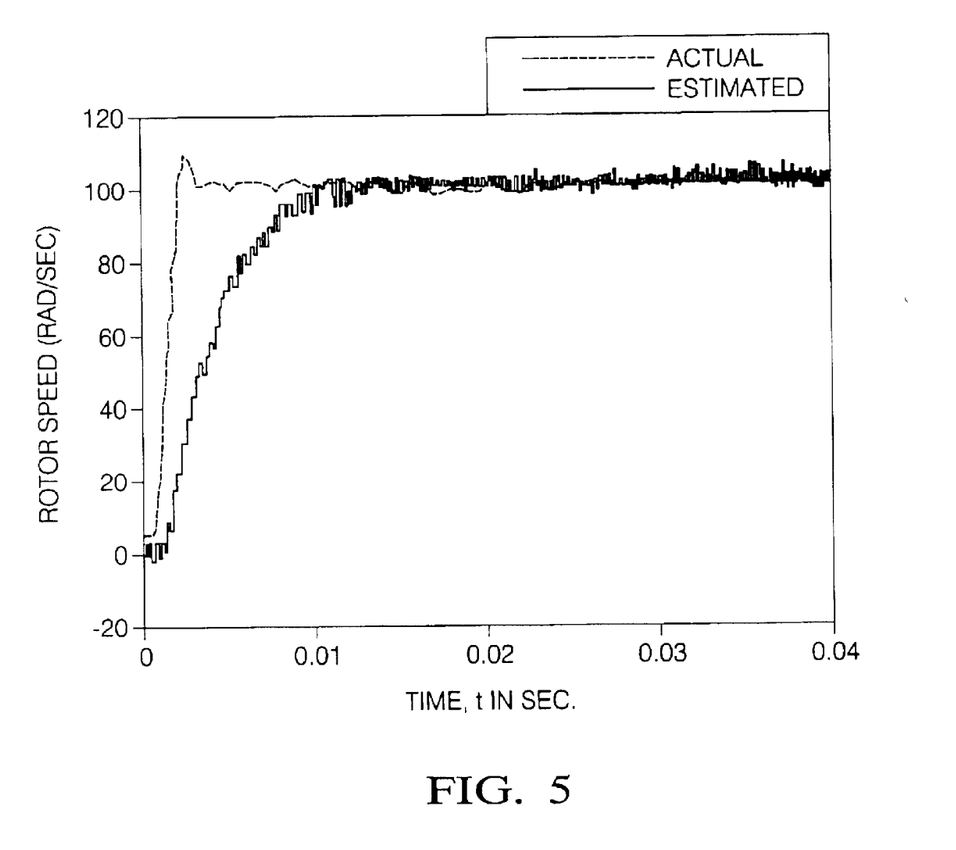
FIG. 5 depicts observer based speed estimation for an exemplary embodiment.

In operation, should the velocity of the SRM 46 reach a selected level, the sensorless operation is configured to transition to the more accurate observer-based position estimation process 200. It will be appreciated that operationally, the observer-based position estimation process 200 is operating in parallel or concurrent with the pulse injection process 100 and has preferably already converged upon accurate estimations for the observer-based estimated position 212 and observer-based estimated velocity 214. Advantageously, under this condition, the SRM 40 drive is controlled in closed loop manner using the more accurate observer-based estimated position 212 and observer-based estimated velocity 214 from the observer-based estimation process 200. When the sensorless operation under the observer-based process predominates, the probing current from the pulse injection process 100 is no longer needed and need not be employed. FIGS. 4 and 5 show the position and speed estimation at 1000 rpm obtained from the observer-based estimation.

The validity of the sensorless SRM operation as disclosed herein in an exemplary embodiment has been verified by preliminary simulation for an SRM. Advantageously, the methodology of the exemplary embodiment disclosed herein eliminates the drawbacks and inherits the merits associated with each process. Moreover, another significant advantage of the embodiments disclosed herein is that no additional sensing or control circuitry is required to implement this methodology, only additional computation in the controller 16 is involved. Additionally, it will be appreciated that one could optionally take advantage of the hybrid concept disclosed here to provide redundancy for an SRM drive, which uses discrete position sensor. Such a configuration would provide increased robustness for the motor control and further facilitate the accuracy of the estimation processes.

Moreover, in another exemplary embodiment, it will be appreciated that the abovementioned techniques may readily be employed for implementation with and in cooperation with parameter identification techniques as is disclosed in commonly assigned copending U.S. patent application Ser. No. 10/404,420, the contents of which are incorporated herein in their entirety. Advantageously, it will be appreciated that the above identified approach may be applied to sensorless operation for any switched reluctance machine regardless of variations in build, life, temperature, and the like, as well as combinations including at least one of the foregoing. For example, since the model 210 represents the actual SRM 46, when the model 210 converges to a point of eliminating error in the recursive algorithm, the resultant model may thereafter be employed to predict the other parameters of the switched reluctance machine. In yet another exemplary embodiment, sensorless operation as disclosed herein may be combined with the parameter identification processes of that patent to further enhance to accuracy of the model and operation of the SRM 46 over a variety of operational conditions.

The disclosed invention can be embodied in the form of computer or controller implemented processes and apparatuses for practicing those processes. The present invention can also be embodied in the form of computer program code containing instructions embodied in tangible media 13, such as floppy diskettes, CD-ROMs, hard drives, or any other computer-readable storage medium, wherein, when the computer program code is loaded into and executed by a computer or controller, the computer becomes an apparatus for practicing the invention. The present invention may also be embodied in the form of computer program code as a data signal 15, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be appreciated that the use of first and second or other similar nomenclature for denoting similar items is not intended to specify or imply any particular order unless otherwise stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for sensorless control of a switched reluctance electric machine comprising:
   probing a selected diagnostic phase of said switched reluctance electric machine with a pulse injection process;
   measuring an actual operating characteristic of said switched reluctance electric machine;
   computing an inductance based on said actual operating characteristic and correlating said inductance with a position to formulate an estimated position;
   modeling said switched reluctance electric machine to formulate an observer-based estimated position;
   selecting at one of said estimated position, said observer-based estimated position, and a combination thereof to formulate a selected position of said switched reluctance machine; and
   controlling said switched reluctance machine based on said selected position and a command.

2. The method of claim 1 further including computing an estimated velocity for said switched reluctance machine from said estimated position.

3. The method of claim 1 further including computing an observer-based estimated velocity for said switched reluctance machine resultant from said modeling.

4. The method of claim 1 further including selecting at least one of said estimated velocity, said observer-based estimated velocity, and a combination thereof to formulate a selected velocity of said switched reluctance machine.

5. The method of claim 4 further including controlling said switched reluctance machine based on said selected velocity.

6. The method of claim 1 wherein said command comprises one or more of a current command, a voltage command, and a torque command.

7. The method of claim 1 wherein said actual operating characteristic includes voltage and current.

8. The method of claim 1 wherein said modeling comprises a look-up table based on said command and a previous modeled operating characteristic.

9. The method of claim 1 wherein said modeling comprises a recursive analytical expression based said command and said previous modeled operating characteristic.

10. A system for control of a switched reluctance electric machine comprising:
    a switched reluctance electric machine including a sensor generating and transmitting a sensor signal indicative of an operating characteristic;
    a controller operatively coupled to said switched reluctance motor and said sensor; and
    said controller executing method:
      probing a selected diagnostic phase of said switched reluctance electric machine with a pulse injection process;
      measuring an actual operating characteristic of said switched reluctance electric machine;
      computing an inductance based on said actual operating characteristic and correlating said inductance with a position to formulate an estimated position;
      modeling said switched reluctance electric machine to formulate an observer-based estimated position;
      selecting at one of said estimated position, said observer-based estimated position, and a combination thereof to formulate a selected position of said switched reluctance machine; and
      controlling said switched reluctance machine based on said selected position and a command.

11. A steering system with a switched reluctance electric motor comprising:
    a steerable wheel coupled to a switched reluctance motor;
    a controller operatively coupled to said switched reluctance motor;
    said controller generating command to direct said switched reluctance motor and executing a method for control:
      probing a selected diagnostic phase of said switched reluctance electric machine with a pulse injection process;
      measuring an actual operating characteristic of said switched reluctance electric machine;
      computing an inductance based on said actual operating characteristic and correlating said inductance with a position to formulate an estimated position;
      modeling said switched reluctance electric machine to formulate an observer-based estimated position;
      selecting at one of said estimated position, said observer-based estimated position, and a combination thereof to formulate a selected position of said switched reluctance machine; and
      controlling said switched reluctance machine based on said selected position and a command.

12. A system for controlling a switched reluctance motor in a vehicle steering system comprising:
    a means for probing a selected diagnostic phase of said switched reluctance electric machine with a pulse injection process;
    a means for measuring an actual operating characteristic of said switched reluctance electric machine;
    a means for computing an inductance based on said actual operating characteristic and correlating said inductance with a position to formulate an estimated position;

a means for modeling said switched reluctance electric machine to formulate an observer-based estimated position;

a means for selecting at one of said estimated position, said observer-based estimated position, and a combination thereof to formulate a selected position of said switched reluctance machine; and a means for controlling said switched reluctance machine based on said selected position and a command.

13. A storage medium encoded with a machine-readable computer program code, comprising said computer program code including instructions for causing a controller to implement a method for control of a switched reluctance electric machine:

probing a selected diagnostic phase of said switched reluctance electric machine with a pulse injection process;

measuring an actual operating characteristic of said switched reluctance electric machine;

computing an inductance based on said actual operating characteristic and correlating said inductance with a position to formulate an estimated position;

modeling said switched reluctance electric machine to formulate an observer-based estimated position;

selecting at one of said estimated position, said observer-based estimated position, and a combination thereof to formulate a selected position of said switched reluctance machine;

controlling said switched reluctance machine based on said selected position and a command.

14. A computer data signal, said data signal comprising: code configured to cause a controller to implement a method for control of a switched reluctance electric machine:

probing a selected diagnostic phase of said switched reluctance electric machine with a pulse injection process;

measuring an actual operating characteristic of said switched reluctance electric machine;

computing an inductance based on said actual operating characteristic and correlating said inductance with a position to formulate an estimated position;

modeling said switched reluctance electric machine to formulate an observer-based estimated position;

selecting at one of said estimated position, said observer-based estimated position, and a combination thereof to formulate a selected position of said switched reluctance machine;

controlling said switched reluctance machine based on said selected position and a command.

\* \* \* \* \*